Nov. 23, 1965  C. VAN DER LELY ETAL  3,218,791
TOOLS FOR WORKING CROP OR LIKE MATERIAL LYING ON THE GROUND
Filed Oct. 10, 1960  5 Sheets-Sheet 2

Cornelis & Ary van der Lely
INVENTORS

BY
Mason, Mason & Albright
Attorneys 3,218,791
TOOLS FOR WORKING CROP OR LIKE MATERIAL LYING ON THE GROUND
Cornelis van der Lely, Zug, Switzerland, and Ary van der Lely, Maasland, Netherlands, assignors to C. van der Lely N.V., Maasland, Netherlands, a Dutch limited-liability company
Filed Oct. 10, 1960, Ser. No. 61,677
Claims priority, application Netherlands, Oct. 13, 1959, 244,314
31 Claims. (Cl. 56—377)

This invention relates to tools for working crop or like material lying on the ground. More particularly, the invention relates to the tools of the kind adapted to be mounted for operation on an implement and having tines which during operation of such an implement are periodically brought into working engagement with the ground and/or crop or like material lying thereon. Such tools may, for example, take the form of rake wheels which are adapted to be mounted on a raking implement in such a way that, during use of the implement, the rake wheels revolve and laterally displace loose crop or like material which comes into engagement with them.

It is an object of the invention to prevent, or at least minimize, undesired entanglement of the crop or the like with such tools due to incomplete shedding of the crop or the like from the individual tines after each of them has performed a working engagement.

According to the invention, there is provided a tool of the kind set forth, wherein the tines are provided with guard means carried by the tool, which are deflectable relative to each tine and arranged so that, unless such deflection has taken place, the guard means will serve to mask the tines whereby they are incapable, or substantially incapable, of a working engagement with the crop or like material. The arrangement is further that, during use of the tool, engagement thereof with the ground or material lying thereon or both will cause deflection to take place thereby unmasking the tines to allow the latter to operate. The arrangement is also that, upon the unmasked tines being brought to positions in which they no longer make working engagement with the ground and/or crop or like material, the unmasked tines are re-masked by return of the guard means to the undeflected position, during which return the guard means will assist in the shedding of any crop or like material tending to remain in engagement with the tines during those periods in which they are clear of the ground.

For a better understanding of the invention, and to show how the same may be carried into effect, reference will now be made, by way of example, to the accompanying drawings, in which.

Figures 1, 2, 3:
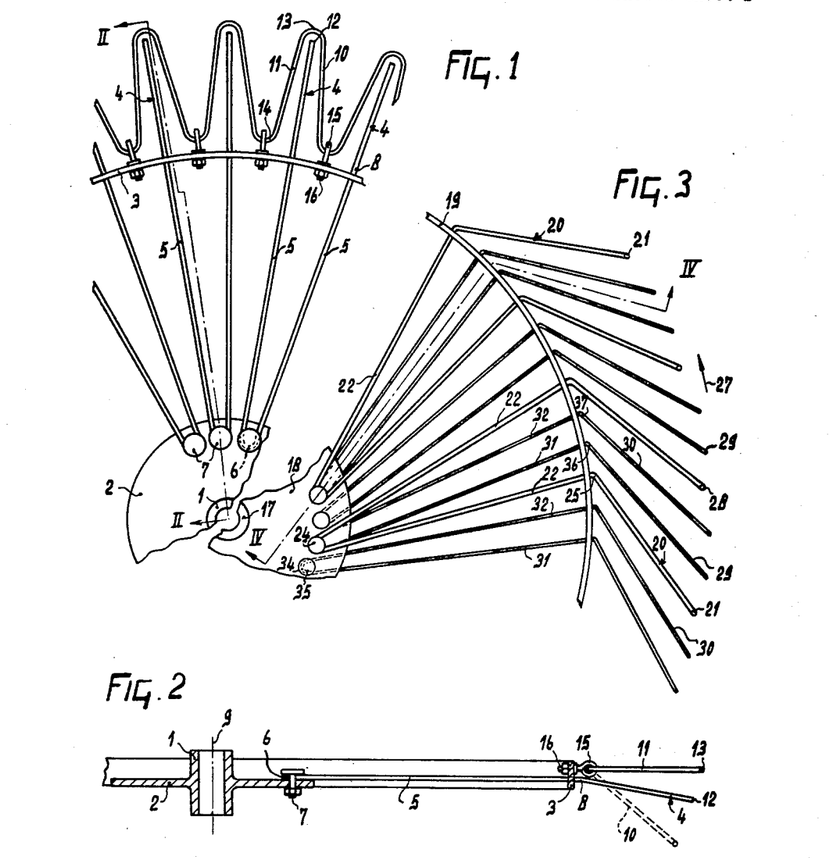
FIGURE 1 is an elevational view of part of a rake wheel in accordance with the invention.
FIGURE 2 is a section taken on the line II—II of FIGURE 1.
FIGURE 3 is an elevational view of part of an alternative form of rake wheel in accordance with the invention.

Referring to the drawings, FIGURES 1 and 2 show a tool in the form of a rake wheel having a hub 1 provided with an integral concentric flange 2 and a felly 3 which is also concentric with the hub 1. A number of tines, each generally indicated by the reference numeral 4, radiate at equally spaced intervals from the flange 2, the tines 4 being made in pairs from lengths of spring steel wire and each pair being secured to the flange 2 by means of a corresponding bolt 7 beneath the head of which is received a curved portion 6 constituting the junction between the two tines. Each time 4 passes through a hole in the felly 3, the felly 3 dividing the tine into a root portion 5 and a crop-working portion 12. Each crop-working portion 12 is gently inclined to the plane containing all the root portions 5 due to each tine 4 being bent at a location 8 disposed on the opposite side of the felly 3 from the hub 1. Each of the crop-working portions 12 is thus inclined to the axis of rotation 9 of the rake wheel at an angle which differs from 90°.

A guard of stellate shape is formed from a continuous length of spring steel wire; each trough 14 of the stellate shape being secured to the felly 3 at a point midway between the adjacent tines 4 by means of an eye 15 and a bolt 16. Each crest 13 of the stellate shape is, when the rake wheel is not in use, disposed around the crop-working portion 12 of a corresponding one of the tines 4, although, as can be seen in FIGURE 2, the crest 13 is offset from the plane containing the crop-working portion 12. The crests 13 and troughs 14 are interconnected by oppositely inclined straight portions 10 and 11 which portions, when the rake wheel is not in use, lie in a plane perpendicular to the axis of rotation 9 of the rake wheel and parallel to the plane containing the root portions 5 of the tines 4. The guard is so arranged that it lies in front of the tines 4 with respect to the direction in which the rake wheel meets crop or the like lying on the ground when the said rake wheel is in use.

Figure 4:
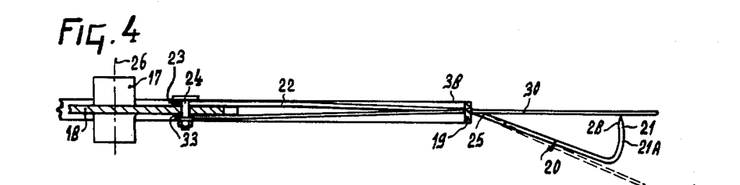
FIGURE 4 is a section taken on the line IV—IV of FIGURE 3.

The rake wheel shown in FIGURES 3 and 4 comprises a hub 17 having an integral concentric flange 18 to which the junctions 23 between pairs of tines 20 are secured by means of bolts 24 in a manner similar to that previously described in respect of the tines 4. The tines 20 pass through holes in a felly 19 which divides each tine 20 into a root portion 22 and a crop-working portion 21. Each tine 20 is bent at a location 25 on that side of the felly 19 which is remote from the hub 17 in such a way that the major part of the length of the crop-working portion 21 is inclined to the plane of rotation of the rake wheel. The root portions 22 of the tines 20 radiate from the flange 18 but are not radially mounted with respect to the axis of rotation 26. Each root portion 22 is, in fact, so disposed that it lies rearwardly, with respect to the intended direction of rotation 27 of the rake wheel, of a line joining the corresponding location 25 to the said axis of rotation 26. The crop working portion 21 of each tine 20 lies in a plane which is inclined to a plane containing the axis of rotation 26 and the corresponding location 25, the first mentioned plane being rearwardly inclined to the latter plane with respect to the intended direction of rotation 27 of the rake wheel.

The whole of the crop-working portion 21 of each tine 20 lies on that side of the plane of rotation of the rake wheel which is disposed rearwardly of the said plane of rotation with respect to that side 38 of the rake wheel which meets crop or like material lying on the ground during the operation thereof. Each crop-working portion 21 has a section 21A at its outer end which is curved but which lies substantially parallel to the axis of rotation 26 of the rake wheel; the opposite ends of the section 21A being disposed closer to the aforesaid axis 26 than is the middle of the section. The free end of each section 21A is sharpened to a point 28 which lies in substantially the same plane as that which contains all the locations 25.

Each tine is provided with guard means formed from spring steel wire which comprises two portions 29 and 30 disposed on opposite sides of the tine 20, each portion passing through a hole in the felly 19 and being respectively integral with the root portions 31 and 32, and the portions 29 and 30 being bent rearwardly of the intended direction of rotation 27 from locations 36 and 37 disposed similarly to the locations 25. Each adjament pair of guard means comprised by the four portions 29, 30, 31 and 32 is formed in a single piece from a length of spring steel wire. Such integral guard means lie either between two integral tines 20 or between two tines 20 which are independent of one another. In the first case, a curved portion 33 of the guard means which constitutes the integral connection between the root portions 31 and 32 thereof is secured to the opposite side of the flange 18 from the curved portion 23 by the same bolt 24 as is used for the corresponding integral tines (see FIGURE 4). In the second case, however, a curved portion 35 constituting the integral connection between the root portions 31 and 32 is independently secured to the same side of the flange as in the first case by means of a bolt 34 (see FIGURE 3).

Figures 5, 6, 7:
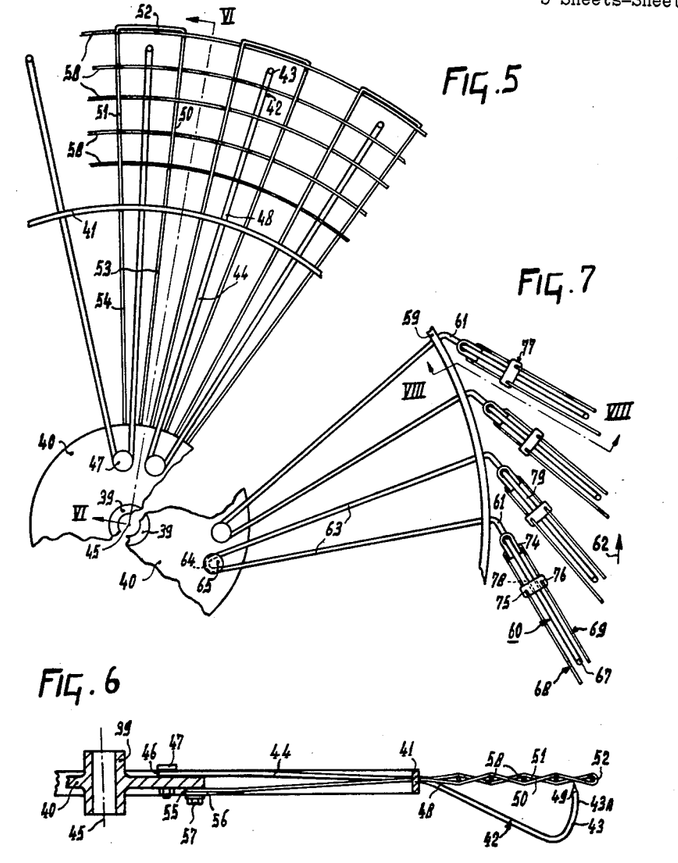
FIGURE 5 is an elevational view of a further alternative embodiment of a rake wheel in accordance with the invention.
FIGURE 6 is a section taken on the line VI—VI of FIGURE 5.
FIGURE 7 is an elevational view of another embodiment of a rake wheel in accordance with the invention.

The rake wheel shown in FIGURES 5 and 6 comprises a hub 39 having an integral concentric flange 40 to which the junctions 46 between pairs of tines 42 are secured by means of bolts 47 in a manner similar to that previously described in respect of the tines 4; the tines 42 passing through holes in a felly 41 which divides each tine 42 into a root portion 44 and a crop-working portion 43. Each tine 42 is bent at a location 48 on that side of the felly 41 which is remote from the hub 39 in such a way that the major part of the length of the crop-working portion 43 is inclined to the plane of rotation of the rake wheel. The whole of the crop-working portion 43 of each tine 42 lies on that side of the plane of rotation of the rake wheel which is disposed rearwardly of the said plane of rotation with respect to the direction in which the rake wheel meets crop or like material lying on the ground during the operation thereof. Each crop-working portion 43 has a section 43A at its outer end which is curved but which lies substantially parallel to the axis of rotation 45 of the rake wheel; the opposite ends of the section 43A being disposed closer to the aforesaid axis 45 than is the middle of the section. The free end of each section 43A is sharpened to a point 49 which lies in substantially the same plane as that which contains all the locations 48.

Each tine 42 is provided with an individual guard which comprises two radial portions 50 and 51 disposed on opposite sides of the tine 42 and a portion 52 interconnecting the outermost ends of the portions 50 and 51. The portions 50 and 51 pass through holes in the felly 41 and are respectively integral with root portions 53 and 54, the innermost ends 55 and 56 of which are looped under the head of a bolt 57 which is received in a screw-threaded bore in the flange 40. Five circular elements 58 are mounted concentrically with respect to the axis of rotation 45 and with respect to the felly 41, the respective spacings between the elements 58 being maintained by virtue of the fact that they are interwoven with the aforesaid radial portions 50 and 51 of each guard. The outermost element 58 is spaced from the axis of rotation 45 by substantially the same distance as are all the connecting portions 52 of the said guards.

As can be seen in FIGURE 6, the whole of the guard lattice formed by the various portions 50, 51 and 52 and the five elements 58 is located, when the rake wheel is not in use, in front of the crop-working portions 43 of the tines 42 with respect to the direction in which the rake wheel meets the crop or like material lying on the ground when the same is in operation. Thus, the guard lattice effectively prevents engagement of the tines with the crop or like material. The guard lattice is, in fact, located in substantially the same plane as that which contains all the locations 48 and points 49.

Figure 8:
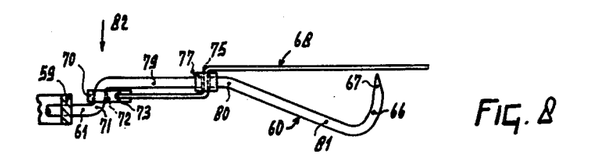
FIGURE 8 is a section, to an enlarged scale, taken on the line VIII—VIII of FIGURE 7.

The rake wheel shown in FIGURES 7 and 8 has a hub and flange which are similar to those shown in FIGURES 5 and 6 and which are, accordingly, designated by the same reference numerals. The rake wheel has a felly 59 through holes in which pass integral pairs of tines 60 having root portions 63 and crop-working portions 81. A curved portion 64 integrally connecting a pair of tines 60 is secured to the flanges 40 by means of a bolt 65. The free end of each tine 60 is provided with a curved section 66 which extends substantially parallel to the axis of rotation of the rake wheel and the center of which is disposed farther away from the said axis of rotation than are the opposite ends thereof. The free end of the section 66 is formed with a point 67.

Each tine 60 is provided with an individual U-shaped guard consisting of two portions 68 and 69 which are located on opposite sides of the tine 60; each guard being supported by its corresponding tine, in contrast to the aforedescribed embodiments in which each guard is secured to other parts of the rake wheel. Each tine 60 supports a tine-holder 70 having a hole 72 which is engaged around a deformed portion 71 of the tine 60. The tine-holder 70 has a bore 73 whose axis is disposed perpendicular to that of the hole 72 and through which passes the integral junction between the two portions 68 and 69. A block 77 is mounted on a straight part 79 of the tine 60, the part 79 passing through a bore 78 in the said block 77. The block 77 is provided with bearing holes 75 and 76 whose axes are both perpendicular to the axis of the bore 78. The bearings 75 and 76 respectively receive deformed parts of the guard portions 68 and 69. The free ends of the portions 68 and 69 lie in a plane disposed at right angles to the axis of rotation 45 of the rake wheel; each portion 68 and 69 and each crop working portion 81 of the tines being inclined rearwardly with respect to the intended direction of rotation 62 of the rake wheel. Due to this rearward inclination, it is necessary that the portions 68 should be somewhat longer than the portions 69 in order that the free ends of both portions should lie at the same distance from the axis of rotation 45, this distance being greater than the distance by which the section 66 is removed from the said axis 45.

As in the case of the tines 20 and 42 previously described, the crop-working portion 81 is inclined from a locatiton 80 on the side of the block 77 remote from the axis 45 in a direction which extends rearwardly of the guard with respect to the direction 82 in which crop or like material encounters the rake wheel when the latter is in operation. Each tine 60 is so shaped that its point 67 lies in the same plane perpendicular to the axis of rotation 45 as does the part 79, the whole of the each crop-working portion 81 lying in a plane which extends parallel to the said axis 45.

Figures 9, 11:
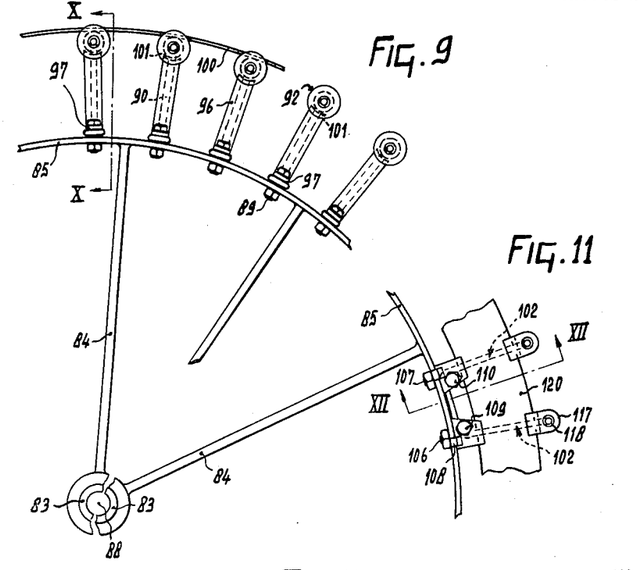
FIGURE 9 is an elevational view of part of another embodiment of a rake wheel in accordance with the invention.
FIGURE 11 is an elevational view of part of another embodiment of a rake wheel in accordance with the invention.
Figures 10, 12, 13:
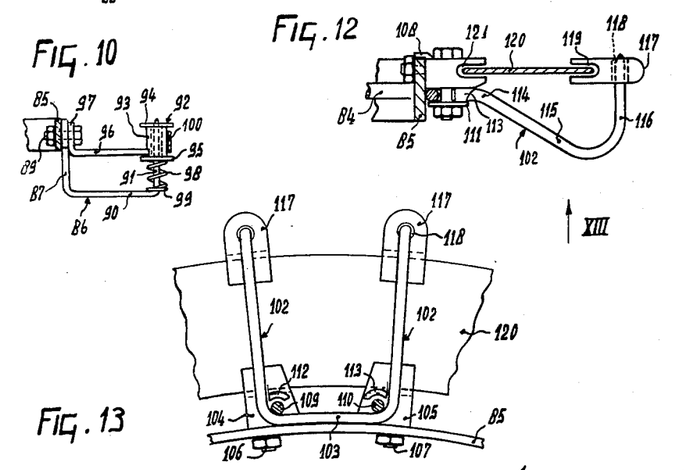
FIGURE 10 is a section taken on the line X—X of FIGURE 9.
FIGURE 12 is a section, to an enlarged scale, taken on the line XII—XII, of FIGURE 11.
FIGURE 13 is a view as seen in the direction of the arrow XIII of FIGURE 12.

The rake wheel shown in FIGURE 9 and 10 comprises a hub 83 which rigidly supports a felly 85 by means of a number of spokes 84. A number of tines 86 are each secured to the side of the felly remote from the axis of rotation 88 of the rake wheel by means of a bolt 89. Each tine 86 comprises two straight portions 87 and 91 which both extend parallel to the said axis of rotation 88 and an integral connecting portion 90 which spaces the portions 87 and 91 from one another; the portion 91 being adapted to work crop like material during operation of the rake wheel. Each crop-working portion 91 is provided with an individual guard 92 which comprises a cylinder 93 which is slidable axially of the portion 91 and which is provided with flanges 94 and 95 at its respective opposite ends. The guard 92 is urged towards the free pointed end of the crop-working portion 91 by means of a compression spring 98 which is coiled around the portion 91 and which bears between the flange 95 and a washer 99 disposed at the junction between the portions 90 and 91. A stop 96 is also secured to the felly 85 by means of a portion 97 through a hole in which passes the aforementioned bolt 89. The end of the stop 96 remote from the portion 97 has a concave recess 101 (see FIGURE 9) which is disposed in close proximity to the cylindircal wall of the guard 94 in such a way that the stop 96 lies in the path of the two flanges 94 and 95 and prevents axial movement of the guard 92 beyond the limits so imposed. The cylinders 93 are interconnected by means of a band 100 but, as shown in FIGURE 9 in respect of two tines, the band 100 may, if desired, be omitted. All the tines 96 are disposed substantially completely behind the plane containing all the spokes 84 with respect to the direction in which crop and like material meets the rake wheel during the operation thereof; the guards 92, however, extending across this plane when the rake wheel is not in use.

The rake wheel shown in FIGURES 11 to 13 has a hub 83, spokes 84 and felly 85 which are of similar construction to those described with reference to FIGURES 9 and 10. Times 102 which are made in integral pairs from lengths of spring steel wire are secured to the side of the felly 85 remote from the axis of rotation 88 by means of supports 104 and 105 which are themselves secured to the felly 85 by means of bolts 106 and 107 respectively; displacement of the supports 104 and 105 relative to the felly 85 being prevented by means of lugs 108 (see FIGURE 12). The tines 102 are, in turn, secured to the supports 104 and 105 by means of bolts 109 and 110 which lie respectively at the bends at which the two tines 102 merge into an integral connecting portion 103. Each of the two bolts is provided with a washer 111 and the tines 102 are clamped between the said washers 111 and the supports 104 and 105 respectively; lugs 112 and 113 being formed on the supports 104 and 105 to provide abutments for the washers 111 so that the latter shall not be twisted into oblique positions upon tightening of the bolts 109 and 110. Each tine 102 has a portion 115 which is inclined rearwardly from a location 114 relative to the direction in which the rake wheel meets crop or like material lying on the ground when the latter is in operation. The portion 115 merges into a pointed section 116 which lies substantially parallel to the axis of rotation 88 of the rake wheel.

Each tine 102 has a guard 117 which engages around the section 116 by means of a bore 118. Each guard 117 is formed with a recess 119 which faces a similarly shaped recess 121 in the corresponding support 104 or 105 and an annular strip 120 concentric with the felly 85 and the hub 83 is disposed around the entire periphery of the rake wheel with its opposite edges received in all the said recesses 119 and 121. The guards 117 are thus interconnected by means of the strip 120 in a non-rigid manner but each of them is prevented from becoming detached from the corresponding section 116 of a tine 102.

Figures 14, 16, 17:
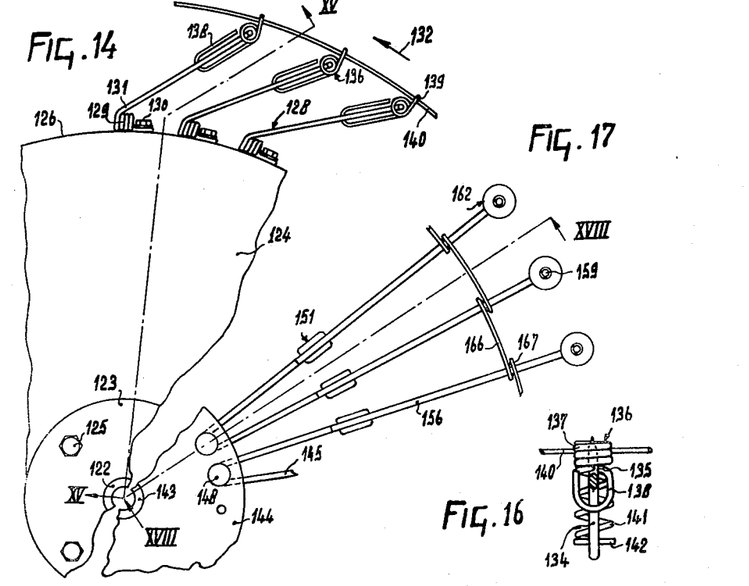
FIGURE 14 is an elevational view of part of another embodiment of a rake wheel in accordance with the invention.
FIGURE 16 is a section, to an enlarged scale, taken on the line XVI—XVI of FIGURE 15.
FIGURE 17 is an elevational view of part of another embodiment of a rake wheel in accordance with the invention.
Figure 15:
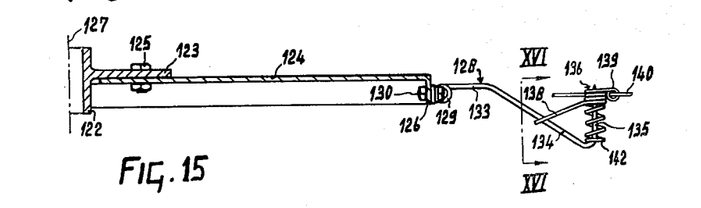
FIGURE 15 is a section taken on the line XV—XV of FIGURE 14.

The rake wheel shown in FIGURES 14 to 16 has a hub 122 provided with an integral flange 123 to which a wheel disc 124 is secured by means of a plurality of bolts 125. The wheel disc 124 has a rim 126 extending parallel to the axis of rotation 127 of the rake wheel to which rim are secured, at equally spaced intervals, a number of tines 128 with the aid of bolts 130. Each tine 128 is made from a length of spring steel wire and is formed, between the bolt 130 and a location 131, with a number of helical turns 129 which lie against the said rim 126. Each tine 128 is bent rearwardly from the said location 131 with respect to the intended direction of rotation 132 of the rake wheel. Each tine 128 includes a portion 133 which extends perpendicular to the axis of rotation 127, a portion 134 inclined rearwardly relative to the direction in which the rake wheel meets crop or like material lying on the ground when it is in operation, and a pointed section 135 which extends substantially parallel to the axis of rotation 127.

Each section 135 has a guard 136 disposed therearound, the guard 136 comprising three helical turns of wire 137 which merge into an element 138 the free end of which is engaged around the inclined portion 134 of the tine 128. The end of the wire remote from the element 138 is formed with a loop 139 through which passes a further wire 140 which extends around the entire periphery of the rake wheel and interconnects the similar loops 139 of all the other guards 136. A helical compression spring 141 is disposed around the section 135 and bears against the helical turns 137 and a washer 142 mounted at the junction between the portion 134 and the section 135. This spring 141 urges the guard 136 axially toward the free pointed end of the section 135, the element 138 preventing the guard 136 from becoming detached from the said section 135.

Figures 18, 19:
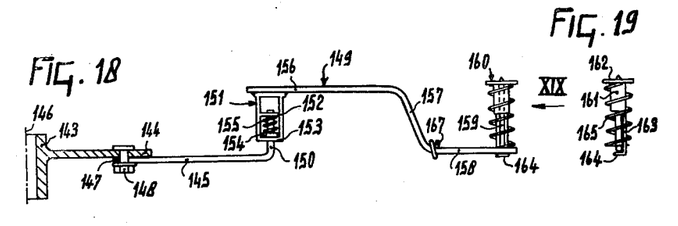
FIGURE 18 is a section taken on the line XVIII—XVIII of FIGURE 17.
FIGURE 19 is a view as seen in the direction of the arrow XIX of FIGURE 18.

The rake wheel shown in FIGURES 17 to 19 comprises a hub 143 having an integral flange 144 to which are secured a number of equally spaced integral pairs of spring steel wire supports 145, the junctions 147 between the said integral supports 145 each being received beneath the head of a bolt 148. The free end of each support 145 is bent-over at 150 and receives a connecting piece 151 to which a corresponding tine 149 is rigidly secured. Each connecting piece 151 includes two spaced lugs 152 and 153 through aligned holes in which passes the bent-over end 150 of the support 145. A collar 154 is rigidly mounted on the bent-over end 150 and a helical compression spring 155 is coiled around the latter and extends between the said collar 154 and the said lug 152. The compression spring 155 is thus so arranged that it tends to maintain the connecting piece 151 and the support 145 in the relative positions shown in FIGURE 18. Each tine 149 extends substantially radially of the axis of rotation 146 of the rake wheel and, by virtue of the connecting piece 151, is slidable through a limited distance in a direction parallel to the said axis 146.

Each tine comprises two portions 156 and 158 which extend substantially perpendicular with respect to the axis 146 and an integral connecting portion 157 which is inclined to that axis. Each tine also includes a crop-working portion in the form of a pointed pin 159 which is secured to the portion 158 in such a way that it extends substantially parallel to the axis of rotation 146. Each pin 159 is provided with a guard 160 in the form of a cylindrical sleeve 161 which has a flange 162 at one end and which is slidable axially of the said pin 159. A helical compression spring 165 is coiled around the cylindrical sleeve and the pin 159 and bears between the flange 162 and one side of the portion 158; the spring 165 tending to maintain the guard 160 at the end of the pin 159 remote from the portion 158. In order to prevent dis-engagement of the guard 160 from the pin 159, the cylindrical sleeve 161 is provided with an extension 163 carrying a stop 164 which, when the rake wheel is not in use, abuts against the side of the portion 158 remote from the point of the pin 159. Substantial pivotal movement of the tines 149 about the axis afforded by the bent-over portion 150 of each support 145 is prevented by means of a wire or the like 166 which extends around the entire circumference of the rake wheel and which is looped round each of the tines 149 at the junction between the portions 157 and 158, the said wire 166 being concentric with the axis 146.

Figure 20:
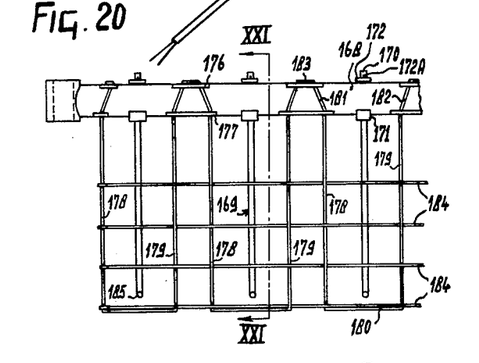
FIGURE 20 is an elevational view of part of a rake bar in accordance with the invention.
Figure 21:
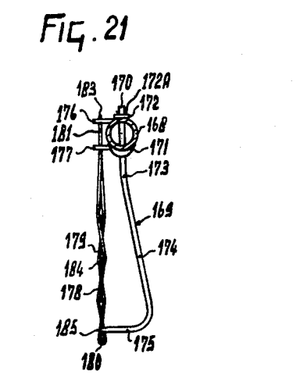
FIGURE 21 is a section taken on the line XXI—XXI of FIGURE 20.

FIGURES 20 and 21 show part of a tool in the form of a tubular rake bar 168 which may be of a kind known per se and which is provided with a number of regularly spaced tines 169 each having a root portion 170, an inclined portion 174 and a horizontal section 175 provided with a point 185. Each root portion 170 has a concave flange 171 rigid therewith, which flange engages the underside of the bar 168, and, at the upper side of the bar 168, is provided with a washer 172 and a split pin 172A which, together with the flange 171, serve to prevent both axial and rotational displacement of each tine 169 relative to the bar 168. The inclined portion 174 of each tine extends rearwardly from a location 173 relative to the direction in which the tines meet crop or like material lying on the ground. A continuous length of spring steel wire forms a guard for each of the tines 169; the guard being formed from vertical portions 178 and 179, oppositely inclined portions 181 and 182, lower portions 180 connecting the portions 178 and 179, and upper portions 183 connecting the inclined portions 181 and 182. The various guards are maintained in position by virtue of the engagement of opposite ends of the inclined portions 181 and 182 in holes formed in upper and lower horizontal lugs 176 and 177 respectively, which lugs project from the side of the bar 168 midway between each pair of adjacent tines 169. Four horizontal guard elements 184 are interwoven with the vertical portions 178 and 179 in such a way that a guard lattice is formed, the lattice lying in a substantially vertical plane when the rake bar 168 is not in use, the said plane also including the point 185 of each tine at such times.

Figure 22:
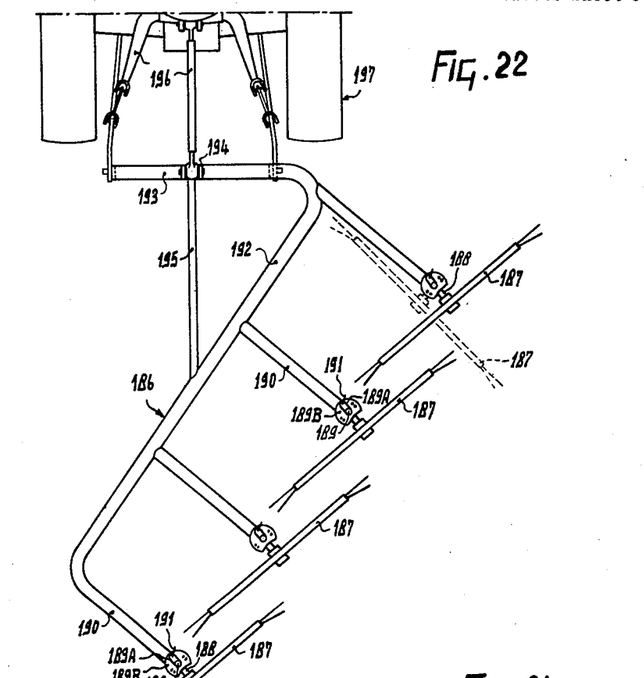
FIGURE 22 is a plan view of a raking implement in position at the rear of a tractor.

FIGURE 22 shows a raking implement 186 in position at the rear of a tractor 197. The implement 186 comprises a transverse frame beam 193 at the center of which a vertical forked frame beam 194 is provided, the beams 193 and 194 being coupled with the lifting links 196 of the tractor 197 in known manner. The transverse frame beam 193 is integral with a main frame beam 192 from which project four supporting frame beams 190, the rearmost frame beam 190 being integral with the main frame beam 192. A strengthening tie 195 extends between the free end of the frame beam 194 and the middle of the frame beam 192. The supports 190 extend parallel to one another and each of them has a rake wheel 187 mounted at its free end, the radius of each rake wheel 187 being substantially equivalent to the length of the corresponding support 190. Each rake wheel 187 is freely rotatable about a horizontal stub axle 188 which, in turn, is rigid with a vertical shaft 189 having an arm 189A rigid therewith. The free end of each arm 189A is formed with a hole which can be brought into alignment with any one of a number of similar holes formed in a plate 189B rigid with the end of the corresponding support 190, a locking pin 191 being inserted in the selected aligned holes to secure the plane of rotation of the rake wheel 187 in a corresponding angular setting.

In the positions of the rake wheels 187 shown in full lines in FIGURE 22, the implement is adapted to function as a side delivery rake, the foremost rake wheel, considered in the intended direction of travel of the implement, delivering crop or like material into the path of the following rake wheel and so on until all the crop or like material is deposited to the left of the rearmost rake wheel. The plane of rotation of each rake wheel can, however, be turned through approximately 90° into the position shown in broken lines for the foremost rake wheel. When all the rake wheels 187 occupy this position, the implement is adapted to function as a tedder, each rake wheel laterally displacing crop or like material independently of its fellows during operation of the implement.

In both the working positions just described, crop or like material, lying on the ground encounters the same side of the plane of rotation of each rake wheel 187 so that, in the first working position, the rake wheel will rotate about its axle 188 in one direction whereas, in the second working position, it will rotate in the opposite direction. By using rake wheels provided with guard means in accordance with the invention, the tines of the said rake wheels may be arranged radially or substantially radially with respect to the axis of rotation of each rake wheel since the guard means will ensure substantially complete shedding of the crop from the tines after each operation thereof. Without the provision of such guard means, it would be almost essential to use rake wheels in which the crop-working portions of the tines were inclined rearwardly with respect to the direction of rotation of the rake wheel in order to ensure shedding of the crop from the tines after each working operation. This is disadvantageous in an implement of the kind shown in FIGURE 22 since, in order to maintain the rearward inclination of the tines, it would be necessary to disconnect each rake wheel from its axle and subsequently invert the rake wheel and reconnect it to the said axle when changing from the first working position to the second, or vice versa.

As has been described in connection with FIGURE 22, rake wheels in accordance with the invention are adapted to be mounted on implements for the lateral displacement of crop lying on the ground, such as side delivery rakes, swath turners or tedders. When such an implement is moved over the ground, the plane of rotation of the rake wheel will be disposed oblique to the direction of travel and will thus be caused to turn about its axis of rotation by virtue of the engagement of the periphery of its lower region with the ground and/or with crop or like material lying thereon. The tines of each rake wheel thus turn repeatedly through 360° about the axis of rotation of the rake wheel and a relatively small region of the periphery of the rake wheel is in engagement with the ground and for the crop lying on the ground during this rotation whereas a relatively large region thereof is out of engagement with the ground. In the case of the rake wheel described with reference to FIGURES 1 and 2 of the drawings, the stellate guard will be resiliently deflected throughout this relatively small region in such a way that the portions 10 and 11 are inclined to the plane of rotation of the rake wheel in a manner similar to that shown in broken lines in FIGURE 2 in respect of one of the portions 10. The crop-working portions 12 of the tines 4 are thus unmasked so that they can engage and laterally displace crop or the like material lying on the ground. It is desirable that no crop or the like should remain entangled around each tine 4 after its engagement with the crop or the like and such entanglement is prevented, or at least substantially reduced, by the guard which, as soon as it passes upwardly out of contact with the ground, springs back into the position shown in full lines in FIGURE 2 in respect of one of the portions 11, thus assisting in shedding any crop which tends to remain entangled around the crop-working portions 12 of the tines 4.

By forming the guard in a single piece as shown in FIGURES 1 and 2 or by interconnecting separate guards as shown in, for example, FIGURES 5 and 6, the advantage is obtained that the resilient deflection of the guard means is effected substantially uniformly over the whole of the aforementioned lower region of the rake wheel, the guard means at the opposite extremities of the said region being deflected gradually as they approach the ground and similarly regaining their original configuration gradually as they retreat from the ground. The construction is such that no sudden movements of the guard means will be caused of the kind which would be likely to tear or otherwise damage the crop or surface of the ground.

When the guards themselves have points, such as in the embodiments described with reference to FIGURES 3 and 4 or to FIGURES 7 and 8, they are themselves rearwardly inclined with respect to the intended direction of the rake wheel in order that, after they have assisted in shedding crop from the similarly inclined tines, no crop shall be left entangled with the guards.

When the rake wheel shown in FIGURES 5 and 6 is in use, the sections 43A of the tines 42 lie substantially parallel to the surface of the ground with the points 49 projecting slightly upwards. This arrangement allows the rake wheel to engage the ground with a substantial pressure but without any substantial risk of damage being caused to the surface of the ground or to turf or the like growing thereon. It is advantageous to be able to urge the peripheries of the rake wheels against the ground with a substantial pressure inasmuch as this allows crop or like material sticking to, or entangled with, ground irregularities or growing plants to be displaced and worked by the rake wheels. The guard lattice comprised by the portions 50, 51 and 52 and the elements 58 is resiliently deflected relative to the tines 42 throughout the said lower region of the rake wheel due to the engagement of the latter with the ground in a similar manner to that described with reference to FIGURES 1 and 2, the point 49 of each tine passing through the guard lattice between the outermost pair of elements 58. However, in this case, the guard lattice cannot pass rearwardly of the tines 42 due to the provision of the elements 58, all but the outermost of which lie against the inclined part of the crop-working portion 43 at such times. The section 43A of each of the tines then disposed in the region of the rake wheel in engagement with the ground is, however, completely freed from the lattice and is thus enabled to laterally displace the crop or like material which it encounters. As each tine moves upwardly out of the said lower region, the lattice gradually regains the position shown in cross-section in FIGURE 4 thus assisting in shedding any crop which tends to remain entangled with the said section 43A. The guard lattice effectively prevents any crop from passing across the plane of rotation of the rake wheel between the tines 42 so that, if desired, the rake wheel may have a lesser number of tines than would be required for a conventional rake wheel of similar size.

The various guards shown in FIGURES 9 to 19 are arranged around the pointed crop-working portions of the corresponding tines and are moved axially into positions in which these portions are unmasked by virtue of their contact with the ground or crop lying on the ground during operation of the implement. For example, in the embodiment shown with reference to FIGURES 9 and 10 of the drawings, the cylindrical guard 92 slides axially of the pointed tine portion 91 upon coming into contact with the ground or the crop until the flange 94 comes into contact with the stop 96, the compression spring 98 having been compressed as a result of this movement.

The free end of each portion 91 is thus successively unmasked to allow it to work the crop, the compression spring 98 serving to restore the relative position shown in FIGURE 10 as soon as each tine 86 has passed upwardly out of the lower region of the rake wheel. By providing the connecting band 100 previously referred to, the aforementioned gradual movement of the guard into and out of the unmasked position of the tines is ensured.

The guards 117 shown in FIGURES 11 to 13 of the drawings, are held in position by the annular strip 120 which is loosely arranged in all the recesses 119 and 121, the strip being of resilient construction to allow the guards 117 to move rearwardly into a position in which the tines 102 are unmasked. The guards 117 are, once again, interconnected to produce the aforementioned gradual unmasking movement followed by a gradual return to substantially the relative position shown in FIGURE 12.

In both the embodiments described with reference to FIGURES 14 to 16 and FIGURES 17 to 19 respectively, each guard is withdrawn to unmask the corresponding tine against the loading of a compression spring, all the guard means 136 in the first case being interconnected for the purpose previously described. In the second case, the guard means are not interconnected but each tine 149 is itself capable of moving relative to the hub 143 of the rake wheel so that each tine can deflect to avoid ground irregularities or obstacles during operation of the rake wheel. The guard lattice shown in FIGURES 20 and 21 will be deflected to the right as seen in FIGURE 21 to unmask the pointed section 175 of each tine 169 upon the said guard lattice meeting crop or like material lying on the ground during movement of the rake bar 168 in a direction parallel to the length of the said sections 175.

Although the implement shown in FIGURE 22 of the drawings has been described as having its rake wheels 187 rotated by contact of their lower portions with the ground or with crop lying thereon or both, it will be clear that the invention may be employed with advantage in implements in which rake wheels, rake bars or the like are motor driven or are driven through couplings with ground-engaging wheels.

What we claim is:

1. A rotary tool for working crop or like material lying on the ground comprising a central member rotatable about a substantially horizontal axis, a plurality of tines extending outwardly from said central member which engage material lying on the ground in their lowermost relative positions, a stripping member associated with each tine which rotates with its associated tine and strips crop or like material therefrom when the tine is clear of the ground, each said stripping member being movable with respect to its associated tine in a direction substantially perpendicular to that which said tine extends from said central member.

2. A tool as claimed in claim 1 wherein said stripping member includes a part which is movable between adjacent tines.

3. A tool as claimed in claim 1 wherein said stripping member lies substantially forward of its associated tine with respect to the direction in which the tool encounters crop or like material lying on the ground during the operation thereof.

4. A tool as claimed in claim 1 wherein said stripping member includes a resilient part whereby it is resiliently movable with respect to said associated tine.

5. A tool as claimed in claim 1 wherein each tine is provided at its free end with a bent-over portion which projects substantially in a direction in which the tool meets crop or like material during the operation thereof.

6. A tool as claimed in claim 5 wherein said bent-over portion extends substantially horizontally during operation of the tool.

7. A tool as claimed in claim 6 wherein the free end of each said bent-over portion inclines upwardly relative to the ground when in the proximity thereof.

8. A tool as claimed in claim 1 wherein each stripping member is supported by its associated tine.

9. A tool as claimed in claim 1 wherein said stripping member extends along the length of each said associated tine.

10. A tool as claimed in claim 1 wherein said stripping member includes a portion extending in close proximity to each of the two opposite sides of its associated tine.

11. A tool as claimed in claim 10 wherein each tine is provided at its free end with a bent-over portion which projects substantially in a direction in which the tool meets crop or like material during the operation thereof and each said stripping member is disposed around said bent-over portion of said associated tine.

12. A tool as claimed in claim 1 wherein said stripping member extends beyond the free end of its associated tine.

13. A tool as claimed in claim 1 wherein said stripping member is connected with the stripping member of at least one other tine.

14. A tool as claimed in claim 13 wherein said stripping members of all the tines are interconnected by a plurality of mutually spaced elements in a lattice structure.

15. A tool as claimed in claim 1 wherein each stripping member is part of an integral single length of resilient material.

16. A tool as claimed in claim 8 wherein each stripping member is of substantially U-shaped formation, and including a holder secured to the base of the associated tine receiving the base of said U-shaped formation.

17. A tool as claimed in claim 16 wherein said holder is secured in a position axially of the said associated tine by means of a deformation included in the latter.

18. A tool as claimed in claim 17 wherein bearings receive the limbs of said U-shaped member, said limbs being each deformed on either side of said bearings whereby they are rendered immovable relative thereto.

19. A tool as claimed in claim 18 wherein said bearings are integral with one another.

20. A tool as claimed in claim 11 wherein said stripping member disposed around said bent-over portion of the said associated tine includes an element secured to a further portion of the said associated tine, whereby disengagement of said stripping member from said bent-over portion is prevented.

21. A tool as claimed in claim 20 wherein a helical spring surrounds said bent-over portion of the tine and bears between said stripping member and said further portion of the said associated tine.

22. A tool as claimed in claim 20 wherein a stop is associated with each said associated tine, said stop being engaged in a recess formed in said stripping member of each said associated tine whereby axial displacement of the stripping member relative to said bent-over portion is limited by said stop.

23. A tool as claimed in claim 22 wherein said stop comprises a resilient annular strip.

24. A tool as claimed in claim 1 which is a rake wheel.

25. A tool as claimed in claim 24 wherein said stripping member extends in the vertical plane of said rake wheel and wherein each of said tines is disposed substantially outside of said plane.

26. A tool as claimed in claim 24 wherein the free end of each tine is located in substantially the vertical plane of said rake wheel.

27. A tool as claimed in claim 24 wherein said central portion comprises a hub and a felly containing holes through which pass said tines, the latter being secured to said hub.

28. A tool as claimed in claim 24 wherein said central portion includes a felly to which said stripping member is secured.

29. A tool as claimed in claim 28 wherein said stripping member is supported by said felly in a plurality of different locations, each such location being disposed substantially midway between two adjacent tines.

30. A rake wheel for working crop or like material lying on the ground which comprises a central portion, a hub member included in said central portion, a plurality of tines extending outwardly from said central portion, a stripping member located forward of the outer end of each of said tines and resiliently associated therewith whereby each said stripping member is alternately deflected from its forward position by the force of material encountered when the associated tine is in the proximity of the ground and is resiliently returned to said position to dislodge material from said associated tine when the latter is raised relative to the ground.

31. A rotary tool for working crop on the ground comprising a circular row of first elongated members, a circular row of second elongated members, each of said first members including a crop-working section extending substantially parallel to the surface of the ground, each of said second members including a guard portion that extends substantially radially about said rotary tool, said second members extending between and substantially radially beyond the crop-working sections, the plane of rotation of said second elongated members being inclined to the direction of travel of the tool, said portions being movable relative to the sections in a direction transverse to the direction of travel of said tool to perform a working operation.

References Cited by the Examiner

UNITED STATES PATENTS

| | | | |
|---|---|---|---|
| 332,421 | 12/1885 | Neely | 172—547 |
| 1,259,803 | 3/1918 | Thompson | 56—400.08 |
| 1,958,757 | 5/1935 | Klinger | 56—400.08 |
| 2,591,572 | 4/1952 | Mascaro | 172—547 |
| 2,811,009 | 10/1957 | Plant | 56—377 |
| 3,012,392 | 12/1961 | Walters et al. | 56—400.08 |

FOREIGN PATENTS

| | | |
|---|---|---|
| 187,731 | 11/1956 | Austria. |
| 82,964 | 2/1957 | Denmark. |
| 1,125,654 | 7/1956 | France. |

ANTONIO F. GUIDA, *Acting Primary Examiner.*

CARL W. ROBINSON, RUSSELL R. KINSEY, T. GRAHAM CRAVER, *Examiners.*